July 29, 1969 F. J. PLANTEIJDT 3,458,155

TAPE TENSION CONTROL APPARATUS

Filed May 4, 1966

INVENTOR.
FRANS J. PLANTEIJDT
BY
Frank R. Trifari
AGENT

United States Patent Office 3,458,155

Patented July 29, 1969

3,458,155

TAPE TENSION CONTROL APPARATUS

Frans Jakob Planteijdt, Eindhoven, Netherlands, assignor, by mesne assignments, to U.S. Philips Corporation, New York, N.Y., a corporation of Delaware Filed May 4, 1966, Ser. No. 547,473
Claims priority, application Netherlands, June 10, 1965, 6507371
Int. Cl. G11b *15/44*
U.S. Cl. 242—186 3 Claims

ABSTRACT OF THE DISCLOSURE

The invention is an apparatus for controlling the tension of a magnetic tape moving between a supply reel and a drive wheel rotated by an electric motor. The motor power consumption, which varies as a function of the tape tension, is used to control the tensioning force supplied by the supply reel. This may be effected by a slipping clutch system coupled to the supply reel which system in the specific embodiment shown consists of an electric motor with adjustable excitation.

The invention relates to a device for driving a tape-shaped record carrier which is unwound from a reel. The reel rotates in a direction opposite to that of a drive which is coupled to the reel through a slipping clutch. The record carrier then travels to a winding reel through a driving shaft against which the record carrier is forced by means of at least one pressure roller. The winding reel is also coupled to its drive through a slipping clutch.

In a known device the tension on the side of the supply reel is measured by a rotating arm provided between the driving shaft and the supply reel. The arm is provided with two rollers between which the record carrier travels. Dependent upon the position of the rotatable arm a braking device is operated on the supply reel. According to the invention, a control magnitude is derived from the value of the current through the motor of the driving shaft. The control magnitude influences the tension of the record carrier on the side of the supply reel. This current depends upon the torque supplied by the motor of the driving shaft. This tension has the advantage that the rotatable arm which has a considerable mass may be omitted and that the control operates substantially inertia-free. For a so-called "closed loop" system this provides the additional advantage that the tension of the record carrier is measured as close as possible to the "closed loop."

According to an embodiment of the device according to the invention the control quantity controls the slipping torque between the drive of the supply reel and the supply reel.

According to another embodiment of the device according to the invention the supply reel is driven by an electric motor which also serves as a slipping clutch. As a result of this the drawbacks of a mechanical slipping clutch, such as "stick-slip" phenomena, are avoided.

According to still another embodiment of the device according to he invention, the control quantity controls the current of the electric supply reel motor. This has the advantage that if the motor of the driving shaft brakes, no current is consumed. In response the electric motor of the supply reel will pull with maximum torque thereby supporting the braking of the motor of the driving shaft. If the number of rotations of the motor is to be increased, for example, if the speed of the record carrier is to be increased, the motor will consume a current which is higher than the normal current. In response the electric motor of the supply reel will supply a minimum torque.

As a result the starting of the motor of the driving shaft is accelerated.

According to a further embodiment of the device the driving shaft is driven by a direct current motor with a permanent magnetic stator. The motor current is applied through a resistor which is connected in series with the motor, to one of the inputs of a differential amplifier. The other input of the amplifier is supplied with a voltage which is proportional to the current in the unloaded condition of the motor. In this manner the output voltage of the differential amplifier in the unloaded condition of the motor is constant with variable speed.

This has the advantage, that, when the driving shaft is switched to various speeds which in themselves are constant, the control maintains the same properties since the output voltage of the differential amplifier in the unloaded condition of the motor of the driving shaft is always the same.

In order that the invention may readily be carried into effect, it will now be described in greater detail, by way of example, with reference to the following figures in which.

Figure 1:
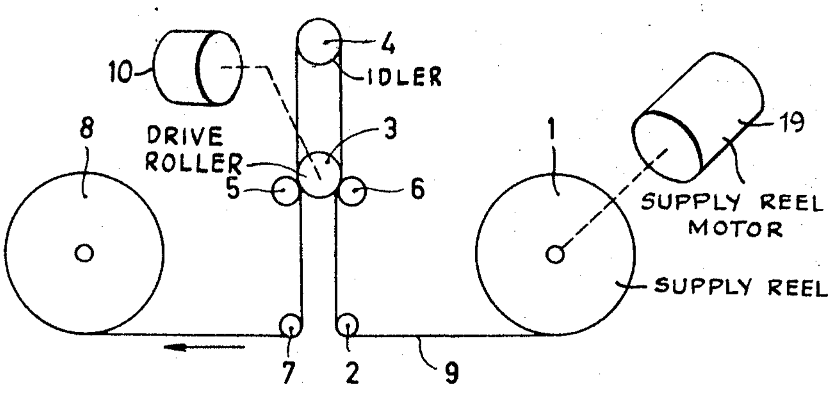
FIG. 1 is a diagrammatic representation of the travel of the tape in the so-called "closed loop" system.

FIG. 1 shows how the record carrier 9 travels from the supply reel 1, which rotates in a direction opposite to that of a drive to which said reel is coupled through a slipping clutch, through a guide pin 2, along the driving roller 3, around an idler 4, again along the driving shaft 3 against which the record carrier 9 is forced by means of two pressure rollers 5 and 6, around a second guide pin 7 to the winding reel 8 which is likewise coupled to the drive through a slipping clutch. If the stress of the record carrier 9 in a part of the tape between the supply reel 1 and the driving shaft 3 becomes too large, the motor of the driving shaft 3 will have to supply a larger torque when the speed remains the same. Therefore the consumed current of the motor of the driving shaft increases. This current is converted into a control magnitude which ensures less braking force is applied to the supply reel 1. The braking torque can be supplied by an electromechanical brake or, which is to be preferred, by slipping torque of an electric motor which drives the supply reel 1 and also serves as a slipping clutch.

Figure 2:
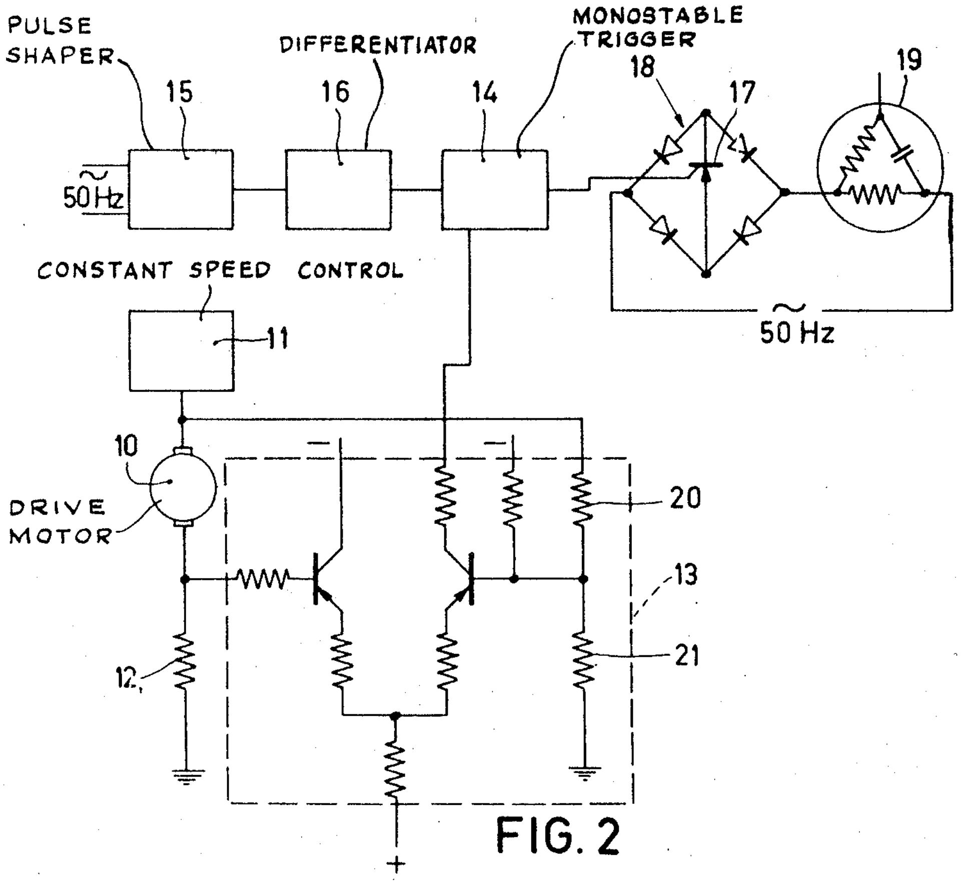
FIG. 2 is an example of a circuit arrangement for controlling the tension of the record carrier according to the invention.

In FIGURE 2 the speed of the motor 10 of the driving shaft 3 is accurately kept constant by means of a control unit 11. If the torque to be supplied to the driving shaft 3 varies the current consumed by the motor 10 also varies so that the voltage across the resistor 12 also varies. This voltage is applied to one of the inputs of the differential amplifier 13 and, after amplification, applied to a monostable trigger circuit 14. This monostable trigger circuit 14 is switched on by pulses which, through a pulse shaper 15 are obtained from the mains and differentiated in a differentiator 16. The voltage from the differential amplifier 13 determines the duration of the pulses from the monostable trigger circuit 14. The electric motor 19 for driving the supply reel 1 is a single-phase asynchronous motor the auxiliary winding of which is supplied through a capacitor. The current of the said electric motor 19 is supplied from the mains through a Graetz circuit 18 in which the current has to traverse the thyristor 17. The thyristor 17 is ignited by the trailing edge of the pulses from the monostable trigger circuit 14, so that during a part of each cycle current is passed through the thyristor 17 to the electric motor 19. The magnitude of this current is determined by the ignition instant which again depends upon the duration of the pulses from the monostable trigger circuit 14. The duration of the trigger pulses is determined in its turn by the voltage from the differential amplifier 13, and thus by the voltage across the resistor 12.

If the motor 10 of the driving shaft 3 has to supply a larger torque the tension of the record carrier 9 on the side of the supply reel being too large, the current through the resistor 12 will increase as a result of which the instant of ignition of the thyristor 17 is shifted. Therefore a smaller part of each cycle of the current is passed through the electric motor 19 as a result of which the torque of said electric motor 19, which torque determines the tension of the record carrier 9 becomes smaller. Consequently the tension of the record carrier 9 also becomes smaller.

If it should be possible for the record carrier 9 to move at more than one speed, the current through the resistor 12 in the unloaded condition of the motor 10 of the driving shaft will vary somewhat so that the tension of the record carrier 9 varies, which is undesirable. Therefore, a voltage is derived from the motor 10 which, through a potentiometer consisting of the resistors 20 and 21, is applied to the second input of the difference amplifier 13. As a result, in the case of a correct choice of the value of the resistors 20 and 21, the influence of the variations of the current through the resistor 12 is compensated at the first input of the difference amplifier 13. Therefore the output voltage of the differential amplifier 13 is constant in the unloaded condition of the motor 10.

If the record carrier 9 is switched from a lower speed to a higher speed, the current through the motor 10 increases and consequently the voltage across the resistor 12 increases, so that the instant of ignition of the thyristor 17 is shifted. As a result of this shift the motor 19 of the supply reel substantially receives no courrent and does not counteract the increase in speed. When the new speed is reached, the torque to be supplied by the motor 10 and consequently also the current through the winding 12 will decrease as a result of which the torque of the electric motor 19 of the supply reel 1 again increases and the correct tension of the record carrier is adjusted again.

The opposite is the case when the record carrier is switched from a given speed to a lower speed. In this case, the torque to be supplied by the motor 10 and the current through resistor 12 initially will be substantially zero. With the input to the differential amplifier 13 at zero the maximum current is conveyed through the electric motor 19 so that a maximum torque is supplied by the said motor to the supply reel 1. As a result of this high current the braking action is intensified until the desired speed is reached.

I claim:

1. Apparatus for controlling the tension of a tape, comprising tape supply means, a rotatable drive wheel frictionally engaging said tape for imparting movement to said tape, and electric drive motor mechanically coupled to rotate said drive wheel at a substantially constant rate, a source of electric current connected to energize said motor controllable clutch means positioned to control the tension of said tape between said supply means and said drive wheel, said motor undergoing changes in operating current in response to changes in the tension of said tape, sensing means electrically connected to said motor for producing a control signal that is variable as a function of said current, and means applying said control signal to said clutch means for controlling the tension of said tape.

2. Apparatus as claimed in claim 1 wherein said controllable clutch means comprises a second electric motor, and wherein said sensing means comprises a resistor in series with said electric drive motor for producing voltage as a function of said drive motor current, and means for amplifying said voltage.

3. Apparatus for controlling the tension of a tape comprising tape supply means, a rotatable drive wheel frictionally engaging said tape for imparting movement to said tape, and electrical drive motor mechanically coupled to rotate said drive wheel at a substantially constant rate, a source of electric current connected to energize said motor, a second electric motor positioned to control the tension on said tape between said supply means and said drive wheel, a resistor connected in series with said electric drive motor for producing a voltage in response to the current through said drive motor, means for amplifying said voltage, and means for applying said amplified voltage to said second electric motor for controlling the tension of said tape.

References Cited

UNITED STATES PATENTS

| | | | |
|---|---|---|---|
| 3,018,978 | 1/1962 | Graneau et al. | 242—75.51 |
| 3,061,228 | 10/1962 | Andrade | 242—75.51 |
| 3,348,107 | 10/1967 | Hamby | 318—6 |

GEORGE F. MAUTZ, Primary Examiner

U.S. Cl. X.R.

226—38, 42; 318—6